United States Patent
De Gaudemaris et al.

(10) Patent No.: US 11,492,465 B2
(45) Date of Patent: Nov. 8, 2022

(54) RUBBER COMPOSITION COMPRISING A SPECIFIC HYDROCARBON RESIN

(71) Applicant: COMPAGNIE GENERALE DES ETABLISSEMENTS MICHELIN, Clermont-Ferrand (FR)

(72) Inventors: Benoit De Gaudemaris, Clermont-Ferrand (FR); Justin Belz, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 0 days.

(21) Appl. No.: 16/604,615

(22) PCT Filed: Apr. 13, 2018

(86) PCT No.: PCT/FR2018/050938
§ 371 (c)(1),
(2) Date: Oct. 11, 2019

(87) PCT Pub. No.: WO2018/189496
PCT Pub. Date: Oct. 18, 2018

(65) Prior Publication Data
US 2020/0157322 A1 May 21, 2020

(30) Foreign Application Priority Data
Apr. 14, 2017 (FR) .................................. 1753289

(51) Int. Cl.
| | | |
|---|---|---|
| *C08L 9/06* | (2006.01) |
| *B60C 1/00* | (2006.01) |
| *C08F 136/06* | (2006.01) |
| *C08F 279/02* | (2006.01) |
| *C08K 3/04* | (2006.01) |
| *C08K 3/36* | (2006.01) |
| *C08L 45/00* | (2006.01) |
| *C08K 5/548* | (2006.01) |
| *C08K 3/06* | (2006.01) |
| *C08K 5/31* | (2006.01) |
| *C08K 5/18* | (2006.01) |
| *C08K 5/09* | (2006.01) |
| *C08K 3/22* | (2006.01) |
| *C08K 5/47* | (2006.01) |
| *C08L 47/00* | (2006.01) |
| *C08L 9/00* | (2006.01) |

(52) U.S. Cl.
CPC ............... *C08L 9/06* (2013.01); *B60C 1/00* (2013.01); *B60C 1/0016* (2013.01); *C08F 136/06* (2013.01); *C08F 279/02* (2013.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08K 5/31* (2013.01); *C08K 5/47* (2013.01); *C08K 5/548* (2013.01); *C08L 9/00* (2013.01); *C08L 45/00* (2013.01); *C08L 47/00* (2013.01); *C08L 2205/03* (2013.01); *C08L 2312/00* (2013.01)

(58) Field of Classification Search
CPC . C08K 3/04; C08K 3/36; C08K 5/548; C08K 5/18; C08K 5/09; C08K 5/31; C08K 3/22; C08K 5/47; C08K 3/06; B60C 1/0016; B60C 1/00; C08L 9/06; C08L 45/00; C08L 9/00; C08L 47/00; C08L 2205/03; C08L 2312/00; C08F 279/02; C08F 136/06
See application file for complete search history.

(56) References Cited

U.S. PATENT DOCUMENTS

| | | |
|---|---|---|
| 5,227,425 A | 7/1993 | Rauline |
| 5,852,099 A | 12/1998 | Vanel |
| 5,900,449 A | 5/1999 | Custodero et al. |
| 6,420,488 B1 | 7/2002 | Penot |
| 6,536,492 B2 | 3/2003 | Vasseur |
| 6,774,255 B1 | 8/2004 | Tardivat et al. |
| 7,217,751 B2 | 5/2007 | Durel et al. |
| 7,250,463 B2 | 7/2007 | Durel et al. |
| 7,300,970 B2 | 11/2007 | Durel et al. |
| 7,488,768 B2 | 2/2009 | Tardivat et al. |
| 7,491,767 B2 | 2/2009 | Durel et al. |
| 7,820,771 B2 | 10/2010 | Lapra et al. |
| 8,461,269 B2 | 6/2013 | Varagniat et al. |

(Continued)

FOREIGN PATENT DOCUMENTS

| | | |
|---|---|---|
| EP | 0501227 A1 | 9/1992 |
| EP | 0735088 A1 | 10/1996 |

(Continued)

OTHER PUBLICATIONS

International Search Report dated May 31, 2018, in corresponding PCT/FR2018/050938 (4 pages).

Primary Examiner — Angela C Scott
(74) Attorney, Agent, or Firm — Venable LLP

(57) ABSTRACT

A rubber composition is based on at least: from 60 to 100 phr of one or more diene elastomers, referred to as very low glass transition temperature (Tg) diene elastomers, exhibiting a Tg within a range extending from −110° C. to −70° C., chosen from butadiene homopolymers, copolymers of butadiene and of vinylaromatic monomer, exhibiting a content of vinylaromatic unit of between 0% and 5% by weight, and the mixtures of these; a reinforcing filler; crosslinking system; and from 50 to 150 phr of at least one hydrocarbon resin predominantly composed of units resulting from α-pinene monomers, the resin exhibiting an aliphatic proton content of greater than 95%.

20 Claims, No Drawings

(56) References Cited

U.S. PATENT DOCUMENTS

| | | |
|---|---|---|
| 8,492,475 B2 | 7/2013 | Araujo Da Silva et al. |
| 8,883,929 B2 | 11/2014 | Gandon-Pain et al. |
| 9,010,393 B2 | 4/2015 | Araujo Da Silva et al. |
| 9,856,368 B2 | 1/2018 | Herzog et al. |
| 2001/0034389 A1 | 10/2001 | Vasseur |
| 2004/0051210 A1 | 3/2004 | Tardivat et al. |
| 2004/0092644 A1* | 5/2004 | Labauze .................. C08L 9/00 524/492 |
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2005/0209413 A1 | 9/2005 | Labauze et al. |
| 2008/0121324 A1 | 5/2008 | Cambon et al. |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-pain et al. |
| 2010/0022714 A1 | 1/2010 | Varagniat et al. |
| 2011/0021702 A1 | 1/2011 | Gandon-Pain et al. |
| 2011/0152458 A1 | 6/2011 | Araujo Da Silva et al. |
| 2012/0208948 A1 | 8/2012 | Gandon-Pain et al. |
| 2012/0252929 A1 | 10/2012 | Yang |
| 2013/0340912 A1* | 12/2013 | Zhao ..................... C08K 3/04 152/543 |
| 2016/0130427 A1* | 5/2016 | Saintigny ................ C08K 5/18 524/571 |
| 2016/0194485 A1 | 7/2016 | Herzog et al. |
| 2016/0319116 A1 | 11/2016 | Labrunie et al. |
| 2016/0376427 A1* | 12/2016 | Sandstrom ............ B60C 1/0016 524/313 |
| 2017/0204256 A1 | 7/2017 | Labrunie et al. |
| 2017/0204257 A1 | 7/2017 | Labrunie et al. |
| 2018/0001702 A1 | 1/2018 | Chatard et al. |
| 2018/0056717 A1 | 3/2018 | Yang |
| 2018/0186978 A1* | 7/2018 | Abad ..................... C08L 9/06 |
| 2018/0340055 A1 | 11/2018 | DeGaudemaris et al. |
| 2019/0367707 A1 | 12/2019 | DeGaudemaris et al. |
| 2020/0190292 A1 | 6/2020 | DeGaudemaris et al. |

FOREIGN PATENT DOCUMENTS

| | | | |
|---|---|---|---|
| EP | 0810258 A1 | 12/1997 | |
| FR | 2 880 893 A1 | 7/2006 | |
| WO | 97/36724 A2 | 10/1997 | |
| WO | 99/16600 A1 | 4/1999 | |
| WO | 00/05300 A1 | 2/2000 | |
| WO | 00/05301 A1 | 2/2000 | |
| WO | 02/30939 A1 | 4/2002 | |
| WO | 02/31041 A1 | 4/2002 | |
| WO | 02/083782 A1 | 10/2002 | |
| WO | 03/002648 A1 | 1/2003 | |
| WO | 03/002649 A1 | 1/2003 | |
| WO | 03/016387 A1 | 2/2003 | |
| WO | 2006/069792 A1 | 7/2006 | |
| WO | 2006/069793 A1 | 7/2006 | |
| WO | 2006/125532 A1 | 11/2006 | |
| WO | 2006/125533 A1 | 11/2006 | |
| WO | 2006/125534 A1 | 11/2006 | |
| WO | 2008/003434 A1 | 1/2008 | |
| WO | 2008/003435 A1 | 1/2008 | |
| WO | 2011/078859 A1 | 6/2011 | |
| WO | 2015/043902 A1 | 4/2015 | |
| WO | 2016/109476 A1 | 7/2016 | |
| WO | WO-2016202968 A1 * | 12/2016 | ............... C08L 9/06 |

\* cited by examiner

RUBBER COMPOSITION COMPRISING A SPECIFIC HYDROCARBON RESIN

BACKGROUND

The invention relates to compositions, especially for tyres, and more particularly to compositions comprising a specific hydrocarbon resin in order to improve the properties of the compositions in combination with elastomers having a very low glass transition temperature (Tg).

It is known from the document WO 2016/109476 that terpene-phenol resins may exhibit an advantage for the braking properties.

It is also known in the prior art that elastomers having a low Tg make possible an improvement in the abrasion performance (WO 2015/043902).

The Applicant Companies have now shown that a particular composition comprising a specific hydrocarbon resin makes it possible to obtain compositions exhibiting an improvement in the dry and wet grip and rolling resistance performance qualities.

SUMMARY

The invention thus relates to a rubber composition based on at least:
from 60 to 100 phr of one or more diene elastomers, referred to as very low glass transition temperature (Tg) diene elastomers, exhibiting a Tg within a range extending from −110° C. to −70° C., chosen from butadiene homopolymers, copolymers of butadiene and of vinylaromatic monomer, exhibiting a content of vinylaromatic unit of between 0% and 5% by weight, and the mixtures of these,
a reinforcing filler,
a crosslinking system,
from 50 to 150 phr of at least one hydrocarbon resin predominantly composed of units resulting from α-pinene monomers, the resin exhibiting an aliphatic proton content of greater than 95%.

Preferably, the tyre according to the invention will be chosen from the tyres intended to equip a two-wheel vehicle, a passenger vehicle, or also a "heavy-duty" vehicle (that is to say, underground, bus, off-road vehicles, heavy road transport vehicles, such as lorries, tractors or trailers), or also aircraft, construction equipment, heavy agricultural vehicles or handling vehicles.

DETAILED DESCRIPTION

I—Constituents of the Composition

The rubber compositions according to the invention are based on at least: from 60 to 100 phr of one or more diene elastomers, referred to as very low glass transition temperature (Tg) diene elastomers, exhibiting a Tg within a range extending from −110° C. to −70° C., chosen from butadiene homopolymers, copolymers of butadiene and of vinylaromatic monomer, exhibiting a content of vinylaromatic unit of between 0% and 5% by weight, and the mixtures of these, a reinforcing filler, a crosslinking system and from 50 to 150 phr of at least one hydrocarbon resin predominantly composed of units derived from α-pinene monomers, the resin exhibiting an aliphatic proton content of greater than 95%.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

When reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant polymer is the polymer representing the greatest weight, with respect to the total weight of the polymers in the composition. In the same way, a "predominant" filler is the one representing the greatest weight among the fillers of the composition. By way of example, in a system comprising just one polymer, the latter is predominant within the meaning of the present invention and, in a system comprising two polymers, the predominant polymer represents more than half of the weight of the polymers. On the contrary, a "minor" compound is a compound which does not represent the greatest fraction by weight among the compounds of the same type.

Within the meaning of the present invention, when reference is made to a "predominant" unit (or monomer) within one and the same compound (or polymer), this is understood to mean that this unit (or monomer) is predominant among the units (or monomers) forming the compound (or polymer), that is to say that it is the one which represents the greatest fraction by weight among the units (or monomers) forming the compound (or polymer). Thus, for example, a resin predominantly composed of units resulting from terpene and phenol monomers is a resin in which the terpene and phenol units together represent the greatest amount by weight among all the units making up the said resin. In other words, a "predominant" monomer or an assembly of "predominant" monomers is a monomer (or an assembly of monomers) which represents the greatest fraction by weight in the polymer. On the contrary, a "minor" monomer is a monomer which does not represent the greatest molar fraction in the polymer.

The compounds mentioned in the description can be of fossil or biobased origin. In the latter case, they may partially or completely result from biomass or be obtained from renewable starting materials resulting from biomass. Polymers, plasticizers, fillers, and the like, are concerned in particular.

I-1 Diene Elastomer

The composition according to the invention can contain just one diene elastomer or a mixture of several diene elastomers.

It should be remembered here that elastomer (or "rubber", the two terms being regarded as synonymous) of the "diene" type should be understood, in a known way, to mean an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, and as is well known to a person skilled in the art, the term "diene elastomer" is understood more particularly to mean:
(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d) a copolymer of isobutene and of isoprene (butyl rubber) and also the halogenated versions, in particular chlorinated or brominated versions, of this type of copolymer.

For the requirements of the invention, the composition comprises, at a content within a range extending from 60 to 100 phr, one or more diene elastomers, referred to as very low Tg diene elastomers, that is to say exhibiting a Tg within a range extending from −110° C. to −70° C., the latter being chosen from butadiene homopolymers, copolymers of butadiene and of vinylaromatic monomer, exhibiting a content of vinylaromatic unit of between 0% and 5% by weight, and the mixtures of these. Thus, the copolymers of butadiene and of vinylaromatic monomer can contain from 95% to less than 100% by weight of diene units and from more than 0% to 5% by weight of vinylaromatic units.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution. In the case of a copolymer based on a diene and on a vinylaromatic, in particular containing butadiene and styrene, the two monomers are preferably randomly distributed.

The said very low Tg diene elastomer can be coupled and/or star-branched or functionalized by a group introduced via a coupling and/or star-branching or functionalization agent known to a person skilled in the art. This group can be located at the linear main elastomer chain end. It will then be said that the diene elastomer is functionalized at the chain end. It is generally an elastomer obtained by reaction of a living elastomer with a functionalization agent, that is to say any at least monofunctional molecule, the functional group being any type of chemical group known by a person skilled in the art to react with a living chain end.

This group can be located in the linear main elastomer chain. It will then be said that the diene elastomer is coupled or else functionalized in the middle of the chain, in contrast to the position "at the chain end" and although the group is not located precisely at the middle of the elastomer chain. It is generally an elastomer obtained by reaction of two chains of the living elastomer with a coupling agent, that is to say any at least difunctional molecule, the functional group being any type of chemical group known by a person skilled in the art to react with a living chain end.

This group can be central, to which n elastomer chains (n>2) are bonded, forming a star-branched structure. It will then be said that the diene elastomer is star-branched. It is generally an elastomer obtained by reaction of n chains of the living elastomer with a star-branching agent, that is to say any polyfunctional molecule, the functional group being any type of chemical group known by a person skilled in the art to react with a living chain end.

A person skilled in the art will understand that a functionalization reaction with an agent comprising more than one functional group which is reactive with regard to the living elastomer results in a mixture of entities functionalized at the chain end and in the middle of the chain, constituting the linear chains of the functionalized elastomer, and also, if appropriate, star-branched entities. Depending on the operating conditions, mainly the molar ratio of the functionalization agent to the living chains, certain entities are predominant in the mixture.

Preferably, for the requirements of the invention, the said very low Tg diene elastomer exhibits a Tg within a range extending from −100° C. to −80° C., preferably from −95° C. to −80° C.

Preferably again, the said very low Tg diene elastomer exhibits a Mooney viscosity within a range extending from 50 to 80. In the present description, Mooney viscosity is understood to mean the ML(1+4) 100° C. Mooney viscosity of a compound, in particular of the modified diene elastomer of the invention, measured according to Standard ASTM D1646.

According to a preferred embodiment, the said very low Tg diene elastomer comprises a copolymer of butadiene and of vinylaromatic monomer, preferably styrene, exhibiting a content of vinylaromatic unit of between 0% and 5% by weight, preferably from 1% to 4% by weight, and also a content of vinyl unit, with respect to the diene portion, ranging from 8% to 15% by weight, preferably ranging from 10% to 15% by weight, with respect to the total weight of the diene elastomer.

Preferably, at least 70% by weight of the said copolymer of butadiene and of vinylaromatic monomer is functionalized, preferably by an alkoxysilane group, optionally partially or completely hydrolysed to give silanol, the alkoxysilane group bearing or not bearing another functional group capable of interacting with a reinforcing filler, the alkoxysilane group being bonded to the diene elastomer via the silicon atom. Preferably, the said copolymer of butadiene and of vinylaromatic monomer is functionalized predominantly in the middle of the chain. The microstructure of these elastomers can be determined by the presence or absence of a polar agent and the amounts of polar agent employed during the anionic polymerization stage. Preferably, when the diene elastomer is based on a diene and on styrene, a polar agent is used during the polymerization stage in amounts such that it promotes the random distribution of the styrene along the polymer chains while retaining the content of 1,2-bonds at preferably between 8% and 15%, preferably from 10% to 15%.

The term "alkoxysilane group which interacts favourably with the reinforcing filler" or "functional group capable of interacting with a reinforcing filler" is understood to mean any alkoxysilane group or other functional group, preferably amine functional group, capable of forming, within a rubber composition reinforced by means of a filler, a physical or chemical bond with the said filler. This interaction can be established, for example, via covalent, hydrogen, ionic and/or electrostatic bonds between the said functional group and functional groups present on fillers.

The alkoxy radical of the alkoxysilane group can be of formula R'O—, where R' represents a substituted or unsubstituted $C_1$-$C_{10}$, indeed even $C_1$-$C_8$, alkyl group, preferably a $C_1$-$C_4$ alkyl group, more preferably methyl and ethyl.

Very preferably according to this second alternative form, the other functional group capable of interacting with a reinforcing filler is a primary, secondary or tertiary amine. This alternative form of the invention is particularly advantageous as a result of the improvement in the hysteresis properties.

In the present description, primary or secondary amine is understood to mean a primary or secondary amine which is or is not protected by a protective group known to a person skilled in the art.

Mention may be made, as secondary or tertiary amine functional group, of amines substituted by $C_1$-$C_{10}$, preferably $C_1$-$C_4$, alkyl radicals, more preferably a methyl or ethyl radical, or else cyclic amines forming a heterocycle comprising a nitrogen atom and at least one carbon atom, preferably from 2 to 6 carbon atoms. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino- groups, preferably the diethylamino- and dimethylamino-groups, are suitable.

Preferably, the functional group capable of interacting with a reinforcing filler is a tertiary amine functional group, preferably diethylamine or dimethylamine.

According to an alternative form of the invention, the functional group, preferably primary, secondary or tertiary amine functional group, capable of interacting with a reinforcing filler is directly bonded to the silicon atom, itself directly bonded to the diene elastomer.

According to another alternative form of the invention, the functional group, preferentially primary, secondary or tertiary amine functional group, capable of interacting with a reinforcing filler and the silicon atom bonded to the diene elastomer are connected together by a spacer group which can be an atom or a group of atoms. The spacer group can be a saturated or unsaturated, cyclic or non-cyclic, linear or branched, divalent $C_1$-$C_{18}$ aliphatic hydrocarbon radical or a divalent $C_6$-$C_{18}$ aromatic hydrocarbon radical and can contain one or more aromatic radicals and/or one or more heteroatoms. The hydrocarbon radical can optionally be substituted.

Preferably, the said copolymer of butadiene and of vinylaromatic monomer comprises more than 0% and up to 30% by weight (more preferably between 0% and 20%), with respect to the total weight of copolymer of butadiene and of vinylaromatic monomer, of a star-branched copolymer of butadiene and of vinylaromatic monomer.

Preferably, the said copolymer of butadiene and of vinylaromatic monomer is present at a content within a range extending from 50 to 100 phr, preferably from 75 to 100 phr, very preferably from 90 to 100 phr.

According to a preferred embodiment, the said very low Tg diene elastomer comprises a butadiene homopolymer, preferably at a content within a range extending from 1 to 50 phr, preferably from 1 to 30 phr, very preferably from 1 to 10 phr.

According to another preferred embodiment, the said copolymer of butadiene and of vinylaromatic monomer is present at a content of 100 phr.

Preferably, the composition according to the invention comprises a total content of very low Tg diene elastomers of 75 to 100 phr, preferably of 90 to 100 phr and more preferably of 100 phr.

When the composition comprises them, the elastomers additional to the very low Tg diene elastomers can be any elastomer known to a person skilled in the art.

I-2 Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica or alumina, or also a blend of these two types of filler.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 and WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

The composition can comprise one type of silica or a blend of several silicas. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface as described in Application WO 03/16837.

The silica preferably has a BET specific surface of between 45 and 400 $m^2/g$, more preferably of between 60 and 300 $m^2/g$.

These compositions can optionally also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use is made in particular of silane polysulfides, referred to as "symmetrical" or "asymmetrical" depending on their specific structure, such as described, for example, in Applications WO 03/002648 (or US 2005/016651) and WO 03/002649 (or US 2005/016650).

Suitable in particular, without the definition below being limiting, are silane polysulfides referred to as "symmetrical", corresponding to the following general formula (III):

$$Z\text{-}A\text{-}S_x\text{-}A\text{-}Z, \quad (III)$$

in which:
  x is an integer from 2 to 8 (preferably from 2 to 5);
  A is a divalent hydrocarbon radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, especially propylene);
  Z corresponds to one of the formulae below:

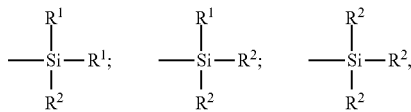

in which:
  the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl),
  the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulfides corresponding to the above formula (III), in particular normal commercially available mixtures, the mean value of the "x" indices is a fractional number preferably of between 2 and 5, more preferably of approximately 4. However, the invention can also advantageously be carried out, for example, with alkoxysilane disulfides (x=2).

Mention will more particularly be made, as examples of silane polysulfides, of bis(($C_1$-$C_4$)alkoxyl($C_1$-$C_4$)alkylsilyl ($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulfides (in particular disulfides, trisulfides or tetrasulfides), more particularly of bis(monoethoxydimethylsilylpropyl) tetrasulfide, such as described in Patent Application WO 02/083782 (or US 2004/132880).

Mention will also be made, as coupling agent other than alkoxysilane polysulfide, of bifunctional POSs (polyorganosiloxanes), or else of hydroxysilane polysulfides ($R^2$=OH in the above formula III), such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber compositions in accordance with the invention, the content of coupling agent is preferably between 1 and 15 phr, more preferably between 3 and 14 phr.

A person skilled in the art will understand that use might be made, as filler equivalent to silica described in the present section, of a reinforcing filler of another nature, in particular organic nature, provided that this reinforcing filler is covered with a layer of silica or else comprises, at its surface, functional sites, in particular hydroxyl sites, requiring the use of a coupling agent in order to establish the bond between the filler and the elastomer.

The physical state under which the reinforcing filler is provided is not important, whether in the form of a powder, of micropearls, of granules, of beads or any other appropriate densified form.

For the requirements of the invention, the content of total reinforcing filler (carbon black and/or reinforcing inorganic filler, such as silica) is from 5 to 200 phr, more preferably from 40 to 160 phr. Below 5 phr of filler, the composition might not be sufficiently reinforced, whereas, above 200 phr of filler, the composition might be less effective in terms of rolling resistance.

Preferably, use is made of silica as predominant filler, preferably at a content ranging from 40 to 150 phr, more preferably from 90 to 150 phr, and optionally of carbon black. The carbon black, when it is present, is used in a minor way, preferably at a content within a range extending from 0.1 to 10 phr, more preferably from 0.5 to 10 phr, in particular from 1 to 5 phr.

I-3 Crosslinking System

In the composition of the invention, use may be made of any type of crosslinking system known to a person skilled in the art for rubber compositions.

The crosslinking system is preferably a vulcanization system, that is to say based on sulfur (or on a sulfur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as are described subsequently.

The sulfur is used at a preferred content of between 0.5 and 10 phr, more preferably of between 0.5 and 5 phr, in particular between 0.5 and 3 phr.

The vulcanization system of the composition according to the invention can also comprise one or more additional accelerators, for example compounds of the family of the thiurams, zinc dithiocarbamate derivatives, sulfenamides, guanidines or thiophosphates. Use may especially be made of any compound capable of acting as accelerator of the vulcanization of diene elastomers in the presence of sulfur, in particular accelerators of the type of thiazoles and their derivatives, and accelerators of type of thiurams or zinc dithiocarbamates. These accelerators are more preferably selected from the group consisting of 2-mercaptobenzothiazyl disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds. Preferably, use is made of a primary accelerator of the sulfenamide type.

I-4 Specific Hydrocarbon Resin

The composition according to the invention comprises a specific hydrocarbon resin.

This hydrocarbon resin is predominantly composed of units resulting from α-pinene monomers, and exhibits an aliphatic proton content of greater than 95%.

Preferably, the hydrocarbon resin of use for the requirements of the invention exhibits an aliphatic proton content within a range extending from 96% to 100%.

According to a preferred embodiment, the hydrocarbon resin of use for the requirements of the invention exhibits an aromatic proton content of less than 5%, preferably of less than 3%. Preferably, the resin exhibits an aromatic proton content of less than 1% and more preferably the resin does not comprise an aromatic proton.

Preferably again, the hydrocarbon resin of use for the requirements of the invention exhibits an ethylenic proton content of less than 5%, preferably of less than or equal to 3%.

Preferably, the hydrocarbon resin of use for the requirements of the invention exhibits a glass transition temperature Tg of greater than 50° C., preferably of greater than 70° C. More preferably, the resin exhibits a glass transition temperature Tg within a range extending from 75° C. to 95° C., preferably from 80° C. to 90° C.

Preferably, the hydrocarbon resin of use for the requirements of the invention exhibits an Mn of greater than 400 g/mol, preferably of greater than 500 g/mol. More preferably, the resin exhibits an Mn within a range extending from 500 to 1000 g/mol, preferably from 500 to 800 g/mol.

According to a preferred embodiment of the invention, the resin exhibits an Mn and a Tg such that the ratio of the value of Mn to the value of Tg is less than or equal to 9, preferably less than or equal to 8.

Preferably, the hydrocarbon resin of use for the requirements of the invention exhibits a polydispersity index (PI) of less than 1.5, preferably of less than 1.4.

Numerous hydrocarbon resins are available commercially. These resins may exhibit characteristics, in particular of chemical composition, of Mn, of aromatic or ethylenic proton content or else of PI, which differ depending on the suppliers.

The macrostructure (Mw, Mn, PI and Mz) of the hydrocarbon resin is determined by size exclusion chromatography (SEC) on the basis of Standards ISO 16014 (*Determination of average molecular mass and molecular mass distribution of polymers using size-exclusion chromatography*), ASTM D5296 (*Standard test method for molecular weight averages and molecular weight distribution of polystyrene by high performance size-exclusion chromatography*) and DIN 55672 (Gel permeation chromatography).

For these measurements, the resin sample is dissolved in non-antioxidized tetrahydrofuran up to a concentration of 1.5 g/l. The solution is filtered with a Teflon filter with a porosity of 0.45 μm, using, for example, a single-use syringe fitted with a filter. A volume of 100 μl is injected through a set of size exclusion chromatography columns. The mobile phase is eluted with a flow rate of 1 ml/min. The columns are thermostatically controlled at 35° C. in an oven. Detection is carried out by a refractometer thermostatically controlled at 35° C. The stationary phase of the columns is based on a polystyrene/divinylbenzene gel having a controlled porosity. The polymer chains are separated according to the size which they occupy when they are dissolved in the solvent: the larger the volume they occupy, the less the pores of the columns are accessible to them and the shorter their elution time.

A Moore calibration curve connecting the logarithm of the molar mass (logM) with the elution time (et) is produced beforehand with polystyrene standards and modelled by a third degree polynomial: log(molar mass of polystyrene)=a+b et+c et2+d et3.

For the calibration curve, polystyrene standards with narrow molecular distributions (polydispersity index, PI, of less than or equal to 1.1) are used. The range of molar masses of these standards extends from 160 to approximately 70 000 g/mol. These standards may be grouped together in "families" of 4 or 5 standards having a logM increment of approximately 0.55 between each family.

Use may be made of certified (ISO 13885 and DIN 55672) standard kits, such as, for example, the kits of vials from PSS (Polymer Standards Service, reference PSS-pskitr1I-3), and also an additional PS standard with Mp=162 g/mol (Interchim, reference 178952). These kits are provided in the form of 3 vials each containing a family of polystyrene standards in suitable amounts:

Black vial: Mp=1220, 4850, 15 500 and 67 500 g/mol.
Blue vial: Mp=376, 3470, 10 400, 46 000 g/mol.
Yellow vial: Mp=266, 1920, 7200, 28 000 g/mol.
PS162: Mp=162 g/mol.

The number-average molar mass (Mn), the weight-average molar mass (Mw), the Mz and the polydispersity of the resin analysed are calculated from this calibration curve. This is why molar masses relative to a polystyrene calibration are spoken of.

For the calculation of the average masses and of the PI, the limits of integration of the elution of the product are defined on the chromatogram corresponding to the injection of the sample. The refractometric signal defined between the two limits of integration is "cut" every second. For each of the "elementary cuts", the elution time ti and the area of the signal from the detector Ai are read off.

It is recalled here that: PI=Mw/Mn with Mw being the weight-average molecular mass and Mn being the number-average molecular mass. It is also recalled that the masses Mw, Mn and Mz are average masses calculated according to the formulae below:

$$Mz = \frac{\sum Ai * Mi^2}{\sum Ai * Mi}$$

$$Mn = \frac{\sum Ai}{\sum \frac{Ai}{Mi}}$$

$$Mw = \frac{\sum Ai * Mi}{\sum Ai}$$

in which Ai is the amplitude of the signal from the refractometric detector corresponding to the mass Mi and to the elution time ti.

The equipment used for the SEC measurement is a liquid chromatography system, for example the Waters Alliance 2690 system comprising a pump, a degasser and an injector; a differential refractometer (for example the Waters 2410 refractometer), software for acquiring and processing the data, for example the Waters Empower software, a column oven, for example the Waters "Column Heater Module", and 4 columns mounted in series in the following order:

| Number | Brand | Range of molar masses (g/mol) | Length (mm) | Internal diameter (mm) | Particle size (μm) | Trade name | References (for information only) |
|---|---|---|---|---|---|---|---|
| Columns 1 and 2 | Polymer Laboratories | 200-400 000 | 300 | 7.5 | 5 | MIXED-D | PL1110-6504 |
| Columns 3 and 4 | Polymer Laboratories | 200-30 000 | 300 | 7.5 | 3 | MIXED-E | PL1110-6300 |

The aromatic proton content (% AH) and the ethylenic proton content (% EH) are measured by $^1$H NMR. This determination is carried out with respect to all of the signals detected. Thus, the results obtained are expressed as % of area of peak.

The samples are dissolved in deuterated chloroform (CDCl$_3$) at the rate of approximately 10 mg of resin in approximately 1 ml of solvent. The spectra are acquired on a Bruker Avance 500 MHz spectrometer equipped with a Bruker "broad band" BBO z-grad 5 mm probe. The $^1$H NMR experiment uses a 30° simple pulse sequence and a repetition delay of 5 seconds between each acquisition. 64 accumulations are carried out at ambient temperature. The chemical shifts are calibrated with respect to the protonated impurity of the deuterated chloroform; δ ppm $^1$H at 7.20 ppm. The $^1$H NMR signals of the aromatic protons are located between 8.5 ppm and 6.2 ppm. The ethylenic protons for their part give rise to signals between 6.2 ppm and 4.5 ppm. Finally, the signals corresponding to the aliphatic protons are located between 4.5 ppm and 0 ppm. The areas of each category of protons are referred to the sum of these areas to thus give a distribution in terms of % of area of each category of protons.

The commercially available resins below were analysed with the methods described above in order to determine their characteristics; Table 1 summarizes the results obtained.

By analysis of the commercial resins, Table 1 shows that only the resins 1 and 2 meet the criteria of the resin of use for the requirements of the invention.

The resin of use for the requirements of the invention, predominantly composed of units resulting from α-pinene monomers, can comprise, in addition to these units and in a minor amount, aliphatic or aromatic units or else units of aliphatic/aromatic type, that is to say based on aliphatic and/or aromatic monomers, other than α-pinene. Preferably, the resin according to the invention is composed of units resulting from α-pinene monomers for more than 90% by weight.

Suitable as additional aliphatic monomers, for example, are the terpene monomers other than α-pinene, such as β-pinene, carenes, limonene or dipentene.

Suitable as additional aromatic monomers are, for example, phenols, styrene, α-methylstyrene, ortho-, meta- or para-methylstyrene, vinyltoluene, para-(tert-butyl)styrene, divinylbenzene, vinylnaphthalene, indene or any vinylaromatic monomer resulting from a C$_9$ fraction (or more generally from a C$_8$ to C$_{10}$ fraction). Preferably, the vinylaromatic monomer is styrene or α-methylstyrene or a vinylaromatic monomer resulting from a C$_9$ fraction (or more generally from a C$_8$ to C$_{10}$ fraction).

The content of resin in the composition according to the invention is within a range extending from 50 phr to 150 phr, preferably from 55 to 120 phr, more preferably from 60 to 115 phr, more preferably still from 60 to 110 phr, better still from 65 to 110 phr. This is because, below 50 phr of the resin of use for the requirements of the invention, the effect of the resin would be insufficient and the composition might exhibit problems of grip, while, above 150 phr, the composition might exhibit a difficulty in manufacturing in order to readily incorporate all the resin in the composition.

I-5 Other Possible Additives

The rubber compositions in accordance with the invention optionally also comprise all or a portion of the normal additives generally used in elastomer compositions intended in particular for the manufacture of treads, such as, for example, pigments, protective agents, such as antiozone waxes, chemical antiozonants or antioxidants, plasticizing

TABLE 1

| Resin | Supplier | Trade name | Tg (° C.) | Monomers | Arom. H content (%) | Ethyl. H content (%) | Aliph. H content (%) | Mn (g/mol) | Mw (g/mol) | PI |
|---|---|---|---|---|---|---|---|---|---|---|
| Resin 1 | Pinova | Piccolyte A125 | 84 | α-Pinene | 0 | 3 | 97 | 515 | 699 | 1.36 |
| Resin 2 | Pinova | R2495 | 93 | α-Pinene | 1 | 3 | 96 | 869 | 1150 | 1.32 |
| Resin 3 | Exxon | Escorez 5600 | 51 | Hydrogenated DCPD-C$_9$ | 11 | 0 | 89 | 481 | 783 | 1.63 |
| Resin 4 | Arizona | Sylvatraxx 4401 | 30 to 40 | Styrene and α-methylstyrene | approximately 50 | 0 | approximately 50 | approximately 650 | approximately 1000 | 1.5 |
| Resin 5 | DRT | Dercolyte L120 | 74 | Limonene | 1 | 2 | 98 | 670 | 1130 | 1.7 | agents other than those described above, anti-fatigue agents, reinforcing resins, methylene acceptors (for example novolac phenolic resin) or methylene donors (for example HMT or H3M).

The composition according to the invention can also comprise a plasticizing system. This plasticizing system can be composed of a hydrocarbon resin with a Tg of greater than 20° C., in addition to the specific hydrocarbon resin described above, and/or a plasticizing oil.

Of course, the compositions in accordance with the invention can be used alone or as a blend (i.e., as a mixture) with any other rubber composition which can be used for the manufacture of tyres.

It is obvious that the invention relates to the rubber compositions described above both in the "raw" or non-crosslinked state (i.e., before curing) and in the "cured" or crosslinked, or else vulcanized, state (i.e., after crosslinking or vulcanization).

I-6 Tyres Comprising the Composition of the Invention

The invention also relates to a tyre comprising a composition according to the invention as described above, with the same preferences as those described in detail for the composition. Preferably, the tyre comprises such a composition according to the invention in all or part of its tread.

II—PREPARATION OF THE RUBBER COMPOSITIONS

The compositions are manufactured in appropriate mixers, using two successive phases of preparation well known to a person skilled in the art: a first phase of thermomechanical working or kneading (sometimes described as "non-productive" phase) at high temperature, up to a maximum temperature of between 110° C. and 200° C., preferably between 130° C. and 180° C., followed by a second phase of mechanical working (sometimes described as "productive" phase) at lower temperature, typically of less than 110° C., for example between 60° C. and 100° C., during which finishing phase the crosslinking or vulcanization system is incorporated; such phases have been described, for example, in Applications EP-A-0 501 227, EP-A-0 735 088, EP-A-0 810 258, WO00/05300 or WO00/05301.

The first (non-productive) phase is preferably carried out in several thermomechanical stages. During a first stage, the elastomers, the reinforcing fillers and the hydrocarbon resin (and optionally the coupling agents and/or other ingredients, with the exception of the crosslinking system) are introduced into an appropriate mixer, such as an ordinary internal mixer, at a temperature of between 20° C. and 100° C. and preferably between 25° C. and 100° C. After a few minutes, preferably from 0.5 to 2 min, and a rise in the temperature to 90° C. to 100° C., the other ingredients (that is to say, those which remain, if not all were put in at the start) are added all at once or portionwise, with the exception of the crosslinking system, during a compounding ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling of the mixture thus obtained, the crosslinking system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or of a plaque, in particular for a laboratory characterization, or else extruded, in order to form, for example, a rubber profiled element used in the manufacture of semi-finished products for tyres. These products can subsequently be used in the manufacture of tyres, according to techniques known to a person skilled in the art, with the advantage of the invention, namely good tack of the layers on one another before curing of the tyre.

The crosslinking (or curing) is carried out in a known way at a temperature generally of between 130° C. and 200° C., under pressure, for a sufficient time which can vary, for example, between 5 and 90 min, as a function in particular of the curing temperature, of the crosslinking system adopted, of the kinetics of crosslinking of the composition under consideration or else of the size of the tyre.

The examples which follow illustrate the invention without, however, limiting it.

III—Implementational Examples of the Invention

III-1 Preparation of the Examples

In the examples which follow, the rubber compositions were produced as described above.

III-2 Characterization of the Examples

In the examples, the rubber compositions are characterized, before and/or after curing, as indicated below.

Dynamic Properties (After Curing)

The dynamic properties G* and tan($\delta$)max are measured on a viscosity analyser (Metravib V A4000) according to Standard ASTM D 5992-96. The response of a sample of vulcanized composition (cylindrical test specimen with a thickness of 4 mm and with a diameter of 10 mm), subjected to a simple alternating sinusoidal shear stress, at a frequency of 10 Hz, is recorded. A temperature sweep is carried out from −80° C. to +100° C. with a gradient of +1.5° C./min, under a maximum stress of 0.7 MPa. The value of the tangent of the loss angle (tan($\delta$)) is subsequently recorded at 0° C., 60° C. and 100° C.

For the value of tan($\delta$) at 0° C., the higher the value, the more the composition will make possible a good wet grip. The results are expressed in terms of performance in base 100, that is to say that the value 100 is arbitrarily assigned to the best control, in order to calculate and subsequently compare the tan($\delta$) at 0° C. of the various solutions tested. The value in base 100 is calculated according to the operation: (value of tan($\delta$) at 0° C. of the sample/value of tan($\delta$) at 0° C. of the control)*100. In this way, a lower value represents a reduction in the grip performance (that is to say, a lower tan($\delta$) value at 0° C.), while a higher value represents a better grip performance (that is to say, a higher tan($\delta$) value at 0° C.).

The lower the value of tan($\delta$) at 60° C., the lower will be the hysteresis of the composition and thus the lower will be the rolling resistance. The results are expressed in terms of performance in base 100, that is to say that the value 100 is arbitrarily assigned to the best control, in order to subsequently compare the tan($\delta$) at 60° C. (that is to say, the hysteresis—and thus the rolling resistance) of the various solutions tested. The value in base 100 is calculated according to the operation: (value of tan($\delta$) at 60° C. of the control/value of tan($\delta$) at 60° C. of the sample)*100. In this way, a lower value represents a reduction in the hysteresis performance (that is to say, an increase in the hysteresis), while a higher value represents a better hysteresis performance (that is to say, a lower hysteresis).

For the value of tan($\delta$) at 100° C., the higher the value, the more the composition will make possible a good dry grip. The results are expressed in terms of performance in base 100, that is to say that the value 100 is arbitrarily assigned to the best control, in order to calculate and subsequently compare the tan($\delta$) at 100° C. of the various solutions tested. The value in base 100 is calculated according to the operation: (value of tan($\delta$) at 100° C. of the sample/value of tan($\delta$) at 100° C. of the control)*100. In this way, a lower value represents a reduction in the grip performance (that is to say, a lower tan($\delta$) value at 100° C.), while a higher value represents a better grip performance (that is to say, a higher tan($\delta$) value at 100° C.).

III-3 Examples

The compositions are manufactured with introduction of all of the constituents onto an internal mixer, with the exception of the vulcanization system. The vulcanization agents (sulfur and accelerator) are introduced onto an external mixer at low temperature (the constituent rollers of the mixer being at approximately 30° C.).

SBR A—Preparation of an SBR which is Aminoalkoxysilane-Functional in the Middle of the Chain with Tg −88° C.

Methylcyclohexane, butadiene, styrene and tetrahydrofurfuryl ethyl ether are continuously introduced, according to the following proportions: butadiene flow rate by weight=4.013 kg·h$^{-1}$, styrene flow rate by weight=0.122 kg·h$^{-1}$, concentration by weight of monomer=9.75 wt. %, 15 ppm of tetrahydrofurfuryl ethyl ether, into a 32 l continuously-fed stirred reactor, assumed to be perfectly stirred according to a person skilled in the art. n-Butyllithium (n-BuLi) is introduced in a sufficient amount in order to neutralize the protic impurities introduced by the different constituents present at the inlet of the first reactor; 850 µmol of n-BuLi per 100 g of monomer are introduced.

The various flow rates are calculated in order for the mean residence time in the reactor to be 35 min. The temperature is maintained at 95° C. A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The treated polymer is subsequently separated from its solution by a steam stripping operation and then dried on an open mill at 100° C. The "initial" inherent viscosity measured is 1.98 dl·g$^{-1}$. The number-average molar mass Mn, determined by the SEC technique, is 90 000 g·mol$^{-1}$ and the polydispersity index PI is 1.90. At the outlet of the polymerization reactor, 440 µmol per 100 g of monomer of (3-N,N-dimethylaminopropyl)trimethoxysilane (coupling and star-branching agent CA) in solution in methylcyclohexane are added to the solution of living polymer (CA/Li=0.52).

The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C.

The "final" inherent viscosity measured is 2.52 dl·g$^{-1}$. The jump in viscosity, defined as the ratio of the said "final" viscosity to the said "initial" viscosity, is in this instance 1.27. The Mooney viscosity of this polymer A is 70. The number-average molar mass Mn, determined by the SEC technique, is 168 600 g·mol$^{-1}$ and the polydispersity index PI is 1.68. The microstructure of this polymer is determined by the NIR method. The content of 1,2-units is 12.7%, with respect to the butadiene units. The content by weight of styrene is 2.1%. The glass transition temperature of this polymer is −88° C. The cold flow CF(1+6)100° C. of the polymer is 0.52. The distribution of the entities after functionalization is given with the modelling method described above: 86% of functional chains, 77% of which are functional in the middle of the chain, and 14% of non-functional star-branched chains.

Compositions

The object of the examples presented in Table 2 is to compare the different rubber properties of compositions in accordance with the invention (I1 to I5) with the properties of control compositions (C1 to C5). The properties measured, before and after curing, are presented in Table 3.

TABLE 2

| Composition | I1 | I2 | I3 | I4 | I5 | C1 | C2 | C3 | C4 | C5 |
|---|---|---|---|---|---|---|---|---|---|---|
| Elastomer 1 (1) | 100 | 0 | 0 | 0 | 0 | 0 | 0 | 0 | 0 | 0 |
| Elastomer 2 (2) | 0 | 100 | 0 | 0 | 100 | 100 | 100 | 0 | 0 | 100 |
| Elastomer 3 (3) | 0 | 0 | 100 | 0 | 0 | 0 | 0 | 0 | 0 | 0 |
| Elastomer 4 (4) | 0 | 0 | 0 | 100 | 0 | 0 | 0 | 0 | 50 | 0 |
| Elastomer 5 (5) | 0 | 0 | 0 | 0 | 0 | 0 | 0 | 100 | 0 | 0 |
| Elastomer 6 (6) | 0 | 0 | 0 | 0 | 0 | 0 | 0 | 0 | 50 | 0 |
| Carbon black (7) | 4 | 4 | 4 | 4 | 4 | 4 | 4 | 4 | 4 | 4 |
| Silica (8) | 130 | 130 | 130 | 130 | 130 | 130 | 130 | 130 | 130 | 130 |
| Coupling agent (9) | 13 | 13 | 13 | 13 | 13 | 13 | 13 | 13 | 13 | 13 |
| Resin 1 (10) | 88 | 88 | 88 | 88 | 0 | 0 | 0 | 88 | 88 | 0 |
| Resin 2 (10) | 0 | 0 | 0 | 0 | 88 | 0 | 0 | 0 | 0 | 0 |
| Resin 3 (10) | 0 | 0 | 0 | 0 | 0 | 88 | 0 | 0 | 0 | 0 |
| Resin 4 (10) | 0 | 0 | 0 | 0 | 0 | 0 | 88 | 0 | 0 | 0 |
| Resin 5 (10) | 0 | 0 | 0 | 0 | 0 | 0 | 0 | 0 | 0 | 88 |
| Antioxidant (11) | 4 | 4 | 4 | 4 | 4 | 4 | 4 | 4 | 4 | 4 |
| Stearic acid (12) | 3 | 3 | 3 | 3 | 3 | 3 | 3 | 3 | 3 | 3 |
| DPG (13) | 2.5 | 2.5 | 2.5 | 2.5 | 2.5 | 2.5 | 2.5 | 2.5 | 2.5 | 2.5 |
| ZnO (14) | 1 | 1 | 1 | 1 | 1 | 1 | 1 | 1 | 1 | 1 |
| Accelerator (15) | 2.3 | 2.3 | 2.3 | 2.3 | 2.3 | 2.3 | 2.3 | 2.3 | 2.3 | 2.3 |
| Sulfur | 0.7 | 0.7 | 0.7 | 0.7 | 0.7 | 0.7 | 0.7 | 0.7 | 0.7 | 0.7 |

(1) Elastomer 1: BR polybutadiene, PBT030 sold by Zeon with 8% of 1,2- units of the butadiene part (Tg = −94° C.)
(2) Elastomer 2: SBR A as prepared above, with 2.1% of styrene units and 12.7% of 1,2- units of the butadiene part (Tg = −88° C.)
(3) Elastomer 3: BR, N103 sold by Asahi with 13% of 1,2- units of the butadiene part (Tg = −92° C.)
(4) Elastomer 4: BR: polybutadiene with 0.5% of 1,2- units; 1.2% of trans-1,4- units; 98.3% of cis-1,4- units (Tg = −108° C.)
(5) Elastomer 5: SBR with 16% of styrene units and 24% of 1,2- units of the butadiene part (Tg = −65° C.)
(6) Elastomer 6: NR, natural rubber resulting from TSR20, plasticized, with a Mooney ML1 + 4 = 64
(7) Carbon black, ASTM N234 grade
(8) Silica, Zeosil 1165 MP from Solvay, HDS type
(9) Coupling agent: Si69 from Evonik - Degussa
(10) Resins 1 to 5: cf. Table 1 above
(11) N-(1,3-Dimethylbutyl)-N'-phenyl-p-phenylenediamine (Santoflex 6-PPD) from Flexsys
(12) Stearin, Pristerene 4931 from Uniqema
(13) Diphenylguanidine, Perkacit DPG from Flexsys
(14) Zinc oxide, industrial grade - Umicore
(15) N-Cyclohexyl-2-benzothiazolesulfenamide (Santocure CBS from Flexsys)

TABLE 3

| Composition | I1 | I2 | I3 | I4 | I5 | C1 | C2 | C3 | C4 | C5 |
|---|---|---|---|---|---|---|---|---|---|---|
| Performance tan(δ) at 0° C. (base 100) | 100 | 107 | 105 | 91 | 106 | 81 | 81 | 75 | 87 | 95 |
| Performance tan(δ) at 60° C. (base 100) | 100 | 105 | 105 | 83 | 102 | 133 | 100 | 93 | 83 | 109 |
| Performance tan(δ) at 100° C. (base 100) | 100 | 100 | 93 | 127 | 95 | 69 | 71 | 85 | 125 | 81 |
| Mean of the performance qualities | 100 | 104 | 101 | 100 | 101 | 95 | 84 | 84 | 98 | 95 |

In comparison with the control compositions, it is noted that the compositions 11 to 15 in accordance with the invention make possible an improved compromise in the performance qualities of dry and wet grip and of rolling resistance, as shown by the mean of the performance qualities in Table 3.

The invention claimed is:

1. A rubber composition based on at least:
one or more diene elastomers present in a total content of 60 to 100 phr, exhibiting a Tg within a range extending from −100° C. to −80° C., wherein the one or more diene elastomers are copolymers of butadiene and of vinylaromatic monomer exhibiting a content of vinylaromatic unit of between 0% and 5% by weight, and mixtures thereof;
a reinforcing filler, wherein the reinforcing filler is present in a total content of 40 to 160 phr and is a combination of carbon black and silica, and wherein the silica is present in a total content of 40 to 150 phr;
a crosslinking system, wherein the crosslinking system comprises sulfur and an additional accelerator, wherein the sulfur is present in a total content of 0.5 to 5 phr; and
at least one hydrocarbon resin present in a total content of 65 to 110 phr, and predominantly composed of units resulting from α-pinene monomers, the at least one hydrocarbon resin exhibiting an aliphatic proton content of greater than 95%, an aromatic proton content of less than 5%, and a glass transition temperature Tg within a range extending from 75° C. to 95° C.

2. The rubber composition according to claim 1, wherein the one or more diene elastomers is present at the total content of 75 to 100 phr.

3. The rubber composition according to claim 1, wherein the one or more diene elastomers exhibits a Mooney viscosity within a range extending from 50 to 80.

4. The rubber composition according to claim 1, wherein the one or more diene elastomers comprises a copolymer of butadiene and of vinylaromatic monomer exhibiting a content of vinylaromatic unit of between 0% and 5% by weight and also a content of vinyl unit, with respect to the diene portion, ranging from 8% to 15% by weight with respect to the total weight of the one or more diene elastomers.

5. The rubber composition according to claim 4, wherein at least 70% by weight of the copolymer of butadiene and of vinylaromatic monomer is functionalized.

6. The rubber composition according to claim 5, wherein the copolymer of butadiene and of vinylaromatic monomer is functionalized by an alkoxysilane group, optionally partially or completely hydrolyzed to give silanol, the alkoxysilane group bearing or not bearing another functional group capable of interacting with a reinforcing filler, the alkoxysilane group being bonded to the diene elastomer via the silicon atom.

7. The rubber composition according to claim 5, wherein the copolymer of butadiene and of vinylaromatic monomer is functionalized predominantly in the middle of the chain.

8. The rubber composition according to claim 4, wherein the copolymer of butadiene and of vinylaromatic monomer comprises more than 0% and up to 30% by weight, with respect to the total weight of the copolymer of butadiene and of vinylaromatic monomer, of a star-branched copolymer of butadiene and of vinylaromatic monomer.

9. The rubber composition according to claim 8, wherein the copolymer of butadiene and of vinylaromatic monomer comprises between 0% and 20% by weight of the star-branched copolymer of butadiene and of vinylaromatic monomer.

10. The rubber composition according to claim 1, wherein the copolymer of butadiene and of vinylaromatic monomer is present at a content within a range extending from 90 to 100 phr.

11. The rubber composition according to claim 1, wherein the at least one hydrocarbon resin does not comprise an aromatic unit.

12. The rubber composition according to claim 1, wherein the at least one hydrocarbon resin exhibits an ethylenic proton content of less than 5%.

13. The rubber composition according to claim 1, wherein the at least one hydrocarbon resin exhibits an Mn of greater than 400 g/mol.

14. The rubber composition according to claim 1, wherein the at least one hydrocarbon resin exhibits an Mn within a range extending from 500 to 1000 g/mol.

15. The rubber composition according to claim 1, wherein the at least one hydrocarbon resin exhibits an Mn and a Tg such that the ratio of the value of Mn to the value of Tg is less than or equal to 9.

16. The rubber composition according to claim 1, wherein the at least one hydrocarbon resin exhibits a polydispersity index of less than 1.5.

17. The rubber composition according to claim 1, wherein the at least one hydrocarbon resin is composed of units resulting from α-pinene monomers for more than 90% by weight.

18. The rubber composition according to claim 1 further comprising carbon black at a content within a range extending from 0.1 to 10 phr.

19. A tire comprising a rubber composition according to claim 1.

20. The tire according to claim 19, wherein all or part of a tread of the tire comprises the rubber composition.

* * * * *